(12) United States Patent
Nodera et al.

(10) Patent No.: US 6,465,555 B1
(45) Date of Patent: Oct. 15, 2002

(54) FLAME-RETARDANT THERMOPLASTIC RESIN COMPOSITIONS AND THEIR INJECTION MOLDINGS

(75) Inventors: Akio Nodera; Naoki Mitsuta, both of Ichihara (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 0 days.

(21) Appl. No.: 09/410,030

(22) Filed: Oct. 1, 1999

(30) Foreign Application Priority Data

Oct. 16, 1998 (JP) .............................. 10-294870

(51) Int. Cl.$^7$ ................................. C08K 3/32
(52) U.S. Cl. ....................... 524/414; 524/111; 524/115; 524/457
(58) Field of Search ................... 524/115, 414, 524/457, 500, 537, 539, 556, 729, 111, 611

(56) References Cited

U.S. PATENT DOCUMENTS

| | | | | |
|---|---|---|---|---|
| 4,271,064 A | * | 6/1981 | Dieck | 260/40 R |
| 4,471,080 A | * | 9/1984 | Rinaldi et al. | 523/205 |
| 4,493,913 A | * | 1/1985 | Hirobe et al. | 523/205 |
| 5,364,899 A | * | 11/1994 | Wanatabe et al. | 524/268 |
| 5,449,710 A | | 9/1995 | Umeda et al. | |
| 5,837,757 A | | 11/1998 | Nodera et al. | |
| 5,900,446 A | * | 5/1999 | Nishihara et al. | 524/127 |
| 6,031,031 A | * | 2/2000 | Weber et al. | 524/95 |
| 6,069,206 A | * | 5/2000 | Nishihara et al. | 525/282 |
| 6,071,992 A | * | 6/2000 | Okada et al. | 524/139 |
| 6,111,016 A | * | 8/2000 | Katayama et al. | 525/92 E |
| 6,150,443 A | * | 11/2000 | Nodera et al. | 524/157 |
| 6,197,857 B1 | * | 3/2001 | Nodera et al. | 524/141 |

* cited by examiner

Primary Examiner—Edward J. Cain
(74) Attorney, Agent, or Firm—Oblon, Spivak, McClelland, Maier & Neustadt, P.C.

(57) ABSTRACT

Provided are a flame-retardant thermoplastic resin composition comprising 100 parts by weight of a resin mixture of (A) from 50 to 95% by weight of a polycarbonate resin and (B) from 5 to 50% by weight of a styrenic resin, from 0.1 to 10 parts by weight of (C) red phosphorus, and from 5 to 50 parts by weight of (D) talc, and its injection moldings. The composition comprising a polycarbonate resin and a styrenic resin is troubled little by red coloration with red phosphorus therein. The composition can be well molded into pale color or light color moldings. The color tone and the outward appearance of the moldings are both good, and the heat resistance, impact resistance, rigidity and even the flame retardancy of the moldings are much improved. In the composition, red phosphorus is preferably stabilized.

16 Claims, No Drawings

FLAME-RETARDANT THERMOPLASTIC RESIN COMPOSITIONS AND THEIR INJECTION MOLDINGS

BACKGROUND OF THE INVENTION

1. Field of the Invention

The present invention relates to a flame-retardant thermoplastic resin composition, more precisely, to a flame-retardant thermoplastic resin composition and its injection moldings, which contain red phosphorus serving as a flame retardant, which can be readily colored even in pale color or light color, and which has good moldability, high impact strength and high rigidity.

2. Description of the Related Art

As having the advantages of impact resistance, heat resistance, good electric properties and dimension stability, polycarbonate resins have many applications in various fields of, for example, office automation appliances, information and communication appliances, electric and electronic appliances for industrial use and household use, car parts and building materials. As a rule, polycarbonate resins are self-extinguishable. However, some fields of typically office automation appliances, information and communication appliances, and electric and electronic appliances for industrial use and household use require high flame retardancy, for which are used various flame retardants to ensure their flame retardancy.

On the other hand, moldings for housings and parts for office automation appliances such as duplicators and facsimiles, information and communication appliances such as telephones and other communication devices, and for other various electric and electronic appliances are being required to have a complicated shape with local projections or depressions, for example, having ribs or bosses therewith, and to be lightweight and thin-walled from the viewpoint of resources saving. Therefore, desired are polycarbonate resins having increased melt fluidity, or that is, having enhanced injection moldability. Various polycarbonate resin compositions having enhanced moldability have heretofore been proposed, to which are added rubber-modified styrenic resins in consideration of the physical properties such as impact resistance of the moldings of the compositions.

Compositions of polycarbonate resins, to which are added styrenic resins such as acrylonitrile-butadiene-styrene resins (ABS resins), rubber-modified polystyrene resins (HIPS resins) or acrylonitrile-styrene resins (AS resins) for increasing the melt fluidity of the compositions, are known as polymer alloys, and have many applications in the field of various moldings as having good heat resistance and impact resistance. Of such polycarbonate resin moldings, those for office automation appliances, information appliances and other electric and electronic appliances are required to have higher flame retardancy of not lower than a predetermined level so as to ensure and increase the safety of their moldings for those applications.

For improving the flame retardancy of polycarbonate resins, halogen-containing flame retardants such as bisphenol A halides and halogenated polycarbonate oligomers have been used along with a flame retardation promoter such as antimony oxide, as their flame-retarding ability is good. However, with the recent tendency toward safety living and environmental protection, the market requires flame retardation with non-halogen flame retardants. As non-halogen flame retardants, phosphorus-containing organic flame retardants, especially organic phosphate compounds may be added to polycarbonate resin compositions, for which various methods have been proposed. Concretely, for example, Japanese Patent Laid-Open No. 55145/1986 discloses a thermoplastic resin composition comprising (A) an aromatic polycarbonate resin, (B) an ABS resin, (C) an AS resin, (D) a halogen compound, (E) a phosphate, and (F) a polytetrafluoroethylene component. Japanese Patent Laid-Open No. 32154/1990 discloses a molding polycarbonate composition with high flame retardancy and high impact resistance, comprising (A) an aromatic polycarbonate resin, (B) an ABS resin, (C) an AS resin, (D) a phosphate, and (E) a polytetrafluoroethylene component. Japanese Patent Laid-Open No. 239565/1996 discloses a polycarbonate resin composition comprising (A) an aromatic polycarbonate, (B) a rubber-like elastomer-containing, impact-resistant polystyrene resin, (C) a non-halogen phosphate, (D) a core/shell-type, grafted rubber-like elastomer, and (E) talc.

These are all to improve the melt fluidity of polycarbonates thereby improving the moldability thereof, and to improve the impact resistance and the flame retardancy of polycarbonate moldings. With such their good properties, the moldings have many applications. However, in order to make the compositions comprising a polycarbonate resin and a (rubber-modified) styrenic resin and having good melt fluidity have good flame retardancy by adding thereto a phosphorus-containing, organic flame retardant, a relatively large amount of the flame retardant such as a phosphate compound must be added to the compositions. Though their flame-retarding ability is good, phosphate compounds often cause some problems when added to resin compositions. For example, they will bloom resin moldings, or corrode molds used for molding resin compositions, and, in addition, they will lower the impact strength of resin moldings or will yellow them in high-temperature conditions or in high-humidity conditions.

On the other hand, it is well known to use a non-halogen flame retardant, red phosphorus for making polycarbonate resins have flame retardancy. For example, Japanese Patent Publication No. 18356/1993 discloses a flame-retardant thermoplastic resin composition containing spherical red phosphorus with no milled surface, in which the red phosphorus is directly obtained through conversion from yellow phosphorus, and discloses a method for coating treatment of red phosphorus. Japanese Patent Laid-Open No. 53779/1995 discloses the same composition containing spherical or fine-powdery red phosphorus, in which, however, the red phosphorus is obtained through conversion in the presence of a dispersing agent followed by surface treatment. As is obvious from those disclosures, red phosphorus serving as a flame retardant is stabilized by coating its surface with a thermosetting resin or an inorganic compound to thereby ensure its safety and to prevent phosphine gas formation from it during storage, safe-keeping, transportation, handling, and mixing with thermoplastic resins.

Though red phosphorus exhibits its good flame-retarding ability even when its amount is relatively small, polycarbonate resins containing it color in red, and are difficult to color in light color or pale color. Japanese Patent Laid-Open No. 295164/1993 discloses a technique of improving the outward appearance of pale color moldings, for which is used red phosphorus as so controlled that the amount of red phosphorus grains having a grain diameter of 25 μm or larger therein is not larger than 10% by weight of the total. According to the disclosed technique, red phosphorus added is prevented from forming spots on the surfaces of the moldings to worsen the outward appearance of the moldings. However, as in Examples in the laid-open specification, red phosphorus is substantially combined with an organic phosphorus compound, of which the amount is 20 parts by weight relative to 100 parts by weight of the resin. Therefore, the disclosed technique still involves the problem with organic phosphorus compounds, and, in addition, could not still solve the problem with red phosphorus to color in red. Anyhow, so far as red phosphorus is used as a flame retardant in resin moldings, red coloration with it must be canceled in order that the moldings could have a desired color tone. For that purpose, in general, an excessive amount of titanium oxide over necessity shall be added to resins for color control. However, adding too much titanium oxide to polycarbonate resin compositions in an amount of 3% by weight or more is often problematic in that the heat resistance of the compositions is lowered to cause resin decomposition, that the strength including impact strength of the resin moldings is greatly lowered, and that silver marks are formed on the surfaces of the moldings. Though red phosphorus has good flame-retarding ability, its use in the art is significantly limited for the reasons noted above.

SUMMARY OF THE INVENTION

In that situation, the object of the present invention is to provide an improved, flame-retardant thermoplastic resin composition comprising a polycarbonate resin and a styrenic resin, especially a rubber-modified styrenic resin, along with red phosphorus, and its injection moldings with much improved flame retardancy. In the composition, the negative influence of red phosphorus on red coloration of the moldings is reduced, and the composition is well molded into pale or light color moldings. The moldings of the composition have good color tone and outward appearance, still having good heat resistance, high impact resistance, high rigidity and much improved flame retardancy.

To attain the object of the invention, we, the present inventors have assiduously studied the technique of making polycarbonate resins have good flame retardancy by adding red phosphorus thereto. Specifically, we have tried various polycarbonate resin compositions comprising a styrenic resin along with red phosphorus for the purpose of improving the moldability of the compositions and of improving the physical properties of the resin moldings. As a result, we have found that, when a specific amount of talc as specifically selected from inorganic fillers is added to a resin composition comprising a polycarbonate resin and a styrenic resin along with red phosphorus serving as a flame retardant, then the problems noted above are all solved. On the basis of this finding, we have completed the present invention.

Specifically, the invention provides the following:
1. A flame-retardant thermoplastic resin composition comprising 100 parts by weight of a resin mixture of (A) from 50 to 95% by weight of a polycarbonate resin and (B) from 5 to 50% by weight of a styrenic resin, from 0.1 to 10 parts by weight of (C) red phosphorus, and from 5 to 50 parts by weight of (D) talc.
2. The flame-retardant thermoplastic resin composition of above 1, wherein red phosphorus is stabilized.
3. The flame-retardant thermoplastic resin composition of above 1, which further contains from 0.05 to 5 parts by weight, relative to 100 parts by weight of the resin mixture of (A) and (B), of (E) a silicone compound having a functional group.
4. The flame-retardant thermoplastic resin composition of above 3, which further contains from 0.05 to 5 parts by weight, relative to 100 parts by weight of the resin mixture of (A) and (B), of (F) a fluoro-oliefinic resin.
5. The flame-retardant thermoplastic resin composition of above 4, which further contains from 1 to 30 parts by weight, relative to 100 parts by weight of the resin mixture of (A) and (B), of (G) a core/shell-type, grafted rubber-like elastomer.
6. The flame-retardant thermoplastic resin composition of above 1, wherein talc has a mean grain size of from 0.5 to 50 $\mu$m and an aspect ratio of from 2 to 20.
7. Injection moldings of the flame-retardant thermoplastic resin composition of any one of above 1 to 6.
8. Housings or parts for office automation appliances, information and communication appliances, and other electric or electronic appliances for industrial use or household use, as produced through injection molding of the flame-retardant thermoplastic resin composition of any one of above 1 to 6.

DETAILED DESCRIPTION OF THE INVENTION

The invention is described in detail hereinunder. First mentioned are the components (A) to (D) constituting the flame-retardant thermoplastic resin composition of the invention.
(A) Polycarbonate Resin (PC)

The polycarbonate resin (PC) serving as the component (A) in the flame-retardant thermoplastic resin composition of the invention is not specifically defined, and may be any and every one known in the art. Generally used are aromatic polycarbonates to be produced from diphenols and carbonate precursors. For example used are polycarbonates as produced by reacting a diphenol and a carbonate precursor in a solution method or in a melt method, such as those as produced through reaction of a diphenol and phosgene or through interesterification of a diphenol and a diphenyl carbonate.

Various diphenols are usable, including, for example, 2,2-bis(4-hydroxyphenyl)propane[bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkanes, bis(4-hydroxyphenyl)oxide, bis(4-hydroxyphenyl)sulfide, bis(4-hydroxyphenyl)sulfone, bis(4-hydroxyphenyl)sulfoxide, bis(4-hydroxyphenyl)ether, and bis(4-hydroxyphenyl)ketone.

As the diphenols for use herein, preferred are bis(hydroxyphenyl)alkanes, especially bisphenol A. The carbonate precursors for use in the invention include, for example, carbonyl halides, carbonyl esters, and haloformates, concretely, phosgene, diphenol dihaloformates, diphenyl carbonate, dimethyl carbonate, and diethyl carbonate. Other diphenols such as hydroquinone, resorcinol, and catechol are also usable in the invention. The diphenols mentioned herein may be used either singly or as combined.

The polycarbonate resin may have a branched structure, for which the branching agent includes, for example, 1,1,1-tris(4-hydroxyphenyl)ethane, α,α',α"-tris(4-hyroxyphenyl)-1,3,5-triisopropylbenzene, phloroglucine, trimellitic acid, and isatin-bis(o-cresol). For controlling the molecular weight of the polycarbonate resin, for example, employable are phenol, p-t-butylphenol, p-t-octylphenol, and p-cumylphenol.

The polycarbonate resin for use in the invention may be a copolymer having a polycarbonate moiety and a polyorganosiloxane moiety, or it may have a moiety of the copolymer. The polycarbonate resin may also be a polyester-polycarbonate resin to be produced through polymerization of a polycarbonate in the presence of an ester precursor, such as a difunctional carboxylic acid (e.g., terephthalic acid) or ester-forming derivative. Various types of different polycarbonate resins may be mixed to give mixed polycarbonate resins for use in the invention. Preferably, however, the polycarbonate resin serving as the component (A) in the invention does not substantially contain a halogen in its structure. In view of its mechanical strength and moldability, it is desirable that the polycarbonate resin has a viscosity-average molecular weight of from 10,000 to 100,000, more preferably from 14,000 to 40,000.

(B) Styrenic Resin

The styrenic resin to be the component (B) in the flame-retardant thermoplastic resin composition of the invention may be a polymer as prepared through polymerization of a monomer or monomer mixture of from 20 to 100% by weight of a monovinylic aromatic monomer such as styrene or α-methylstyrene, from 0 to 60% by weight of a vinyl cyanide-type monomer such as acrylonitrile or methacrylonitrile, and from 0 to 50% by weight of any other vinylic monomer copolymerizable with those monomers, such as maleimide or methyl (meth)acrylate. The polymer includes, for example, polystyrenes (GPPS), acrylonitrile-styrene copolymers (AS resins).

As the styrenic resin, also preferably used herein are rubber-modified styrenlic resins. The rubber-modified styrenic resins are preferably impact-resistant styrenic resins as produced through grafting polymerization of rubber with at least styrenic monomers. The rubber-modified styrenic resins include, for example, impact-resistant polystyrenes (HIPS) as produced through polymerization of rubber such as polybutadiene with styrene; ABS resins as produced through polymerization of polybutadiene with acrylonitrile and styrene; MBS resins as produced through polymerization of polybutadiene with methyl methacrylate and styrene. These rubber-modified styrenic resins may be combined, or may be mixed with other styrenic resins not modified with rubber such as those mentioned above, and the resin mixtures may be used in the invention.

In the rubber-modified styrenic resins, the amount of rubber to modify them may fall, for example, between 2 and 50% by weight, but preferably between 5 and 30% by weight, more preferably between 5 and 15% by weight. If the rubber content is smaller than 2% by weight, the resin composition will have poor impact resistance. If, on the other hand, it is larger than 50% by weight, the thermal stability of the resin composition will be lowered, and the melt fluidity thereof will be also lowered. If so, the resin composition will be unfavorably gelled or yellowed. Specific examples of rubber for use herein include polybutadiene, acrylate and/or methacrylate-having rubber-like polymers, styrene-butadiene-styrene rubber (SBS), styrene-butadiene rubber (SBR), butadiene-acrylic rubber, isoprene rubber, isoprene-styrene rubber, isoprene-acrylic rubber, and ethylene-propylene rubber. Of those, especially preferred is polybutadiene. The polybutadiene usable herein may be any of low-cis polybutadiene (for example, having from 1 to 30 mol % of 1,2-vinyl bonds and from 30 to 42 mol % of 1,4-cis bonds) or high-cis polybutadiene (for example, having at most 20 mol % of 1,2-vinyl bonds and at least 78 mol % of 1,4-cis bonds), and even their mixtures.

In the invention, the styrenic resin to be the component (B) is incorporated in the composition so as to improve the melt fluidity of the polycarbonate resin constituting the composition. In the resin mixture of the polycarbonate resin (A) and the styrenic resin (B) in the composition, the amount of the polycarbonate resin (A) is from 50 to 95% by weight, preferably from 60 to 90% by weight, and that of the styrenic resin (B) is from 5 to 50% by weight, preferably from 10 to 40% by weight. If the amount of the polycarbonate resin of the component (A) constituting the resin mixture is smaller than 50% by weight, the heat resistance and the strength of the moldings of the composition will be poor. On the other hand, if the amount of the styrenic resin of the component (B) is smaller than 5% by weight, the styrenic resin could not satisfactorily exhibit its ability to improve the moldability of the composition. As the styrenic resin (B), preferred are rubber-modified styrenic resins such as those mentioned hereinabove. The ratio of the two resins (A) and (B) constituting the resin mixture may be suitably determined, depending on the molecular weight of the polycarbonate resin, on the type, the molecular weight, the melt index and the rubber content of the styrenic resin, and on the use, the size and the thickness of the moldings to be formed from the composition.

(C) Red Phosphorus

Red phosphorus to be the component (C) in the invention may be any commercially-available one. For example, it may be ordinary red phosphorus, or stabilized red phosphorus, or may also be in the form of a master batch as prepared by previously mixing red phosphorus with a thermoplastic resin. Above all, especially preferred is red phosphorus as stabilized through surface treatment (surface coating) with various substances. Being different from non-processed red phosphorus, stabilized red phosphorus has the advantages of safety and good handlability and gives no bad smell when compositions comprising it are molded. Red phosphorus for use herein may be a dressed one to be prepared by sieving well-known, ground red phosphorus, or may be a spherical one to be directly obtained through thermal conversion of yellow phosphorus.

For stabilizing red phosphorus through surface treatment or coating, for example, usable are thermosetting resins, inorganic compounds and metals. Examples of the thermosetting resins are phenolic resins, phenol-formalin resins, urea resins, urea-formalin resins, melamine resins, melamine-formalin resins, alkyd resins, epoxy resins, and unsaturated polyester resins. The inorganic compounds include, for example, silica, bentonite, zeolite, kaolin, titanium oxide, zinc oxide, magnesium oxide, magnesium carbonate, barium sulfate, calcium phosphate, aluminium hydroxide, magnesium hydroxide, zinc hydroxide, and titanium hydroxide. The metals are those capable of subjecting to ordinary electroless plating, including, for example, iron, nickel, cobalt, copper, zinc, manganese, and aluminium.

For the surface treatment, two or more of those substances combined may be used. In that case, the surface treatment for stabilization with two or more different substances may be effected all at a time, or may be effected in two or more stages. In the plural stage treatment, the first surface treatment with one substance may be followed by the subsequent surface treatment with another one. Through the surface treatment, it is desirable that the red phosphorus content of the coated red phosphorus is at least 20% by weight in view of the flame retardancy and the cost of the coated red phosphorus. It is also desirable that both non-processed red phosphorus and stabilized, surface-treated red phosphorus for use in the invention have a mean grain size of from 0.1 to 100 $\mu$m, more preferably from 0.5 to 50 $\mu$m, even more preferably from 1 to 40 $\mu$m. It is more desirable to use fine grains of red phosphorus in view of the surface area and the aggregation resistance of the grains. Concretely, for use herein, preferred are fine grains of which the large grain content with a grain size of not smaller than 100 μm, more preferably not smaller than 50 μm is as small as possible.

In the resin composition of the invention, the amount of the component (C) red phosphorus falls between 0.1 and 10 parts by weight, but preferably between 0.2 and 6 parts by weight, more preferably between 0.3 and 4 parts by weight, relative to 100 parts by weight of the resin mixture of the polycarbonate resin (A) and the styrenic resin (B) therein. If the red phosphorus content is smaller than 0.1 parts by weight, such is unfavorable since the resin moldings could not have good flame retardancy. However, if the red phosphorus content is larger than 10 parts by weight, such is also unfavorable since too much red phosphorus added to the composition will give bad smell while the composition is molded and since the resin moldings could not have high strength. If desired, a phosphite compound known as a stabilizer, such as triphenyl phosphite, tris(2,4-di-t-butylphenyl)phosphite or distearylpentaerythritol diphosphite, maybe added to the resin composition along with red phosphorus, by which the stability of the composition is much improved. The amount of the stabilizer to be added may fall between 0.05 and 5 parts by weight relative to 100 parts by weight of the resin mixture of (A) and (B). Anyhow, the red phosphorus content and the phosphite compound content of the resin composition shall be suitably and comprehensively determined in consideration of the necessary flame retardancy of the moldings and on the basis of the amount of talc and even the amount of other rubber-like elastomers, if any, in the composition. Specifically, the phosphite compound content shall be determined, depending on the red phosphorus content.

(D) Talc

Talc to be the component (D) in the resin composition of the invention may be any and every one available on the market as an additive to thermoplastic resins. Talc is a hydrous silicate of magnesium, and may contain a minor amount of aluminium oxide, calcium oxide and iron oxide, in addition to the essential components of silicic acid and magnesium oxide. In producing the resin composition of the invention, any talc even containing such minor components is employable. Talc for use herein has a mean grain size of from 0.5 to 50 μm, preferably from 1 to 20 μm. As a rule, it has an aspect ratio of from 2 to 20. The mean grain size and the aspect ratio of talc shall be suitably and comprehensively determined in consideration of the ability of talc to mask red coloration with red phosphorus, the ability thereof to improve the melt fluidity of the resin composition being molded, the necessary properties including impact resistance and rigidity of the resin moldings to be produced, and even the amounts of the other components to be in the composition. If desired, talc for use herein may be surface-treated with fatty acids or the like, or may be ground in the presence of fatty acids or the like.

The amount of the component (D) talc to be in the resin composition falls between 5 and 50 parts by weight, preferably between 7 and 25 parts by weight, relative to 100 parts by weight of the resin mixture of (A) and (B). If its amount is smaller than 5 parts by weight, talc added could not satisfactorily exhibit its effect of masking red coloration with red phosphorus, and its effect of improving the rigidity and the flame retardancy of the moldings of the composition. However, if the amount of talc added is larger than 50 parts by weight, the melt viscosity of the composition will be too high and the moldability thereof will be poor. Therefore, the amount of talc to be in the resin composition shall be suitably and comprehensively determined, depending on the grain size of red phosphorus to be in the composition, the presence or absence of surface treatment of red phosphorus to be therein, the type of the surface-treating agent used, the color of the moldings to be formed from the composition (in terms of the L value thereof), the shape and the thickness of the moldings, and also the moldability of the composition. The amount of talc to be in the resin composition of the invention shall fall within the defined range as above in view of the essential effect thereof, but, as the case may be, it may be larger than 50 parts by weight depending on the shape of the moldings and on the necessary properties including rigidity thereof.

The flame-retardant thermoplastic resin composition of the invention may further contain (E) a silicone compound having a functional group in an amount of from 0.05 to 5 parts by weight, preferably from 0.1 to 2 parts by weight, relative to 100 parts by weight of the resin mixture of the polycarbonate resin (A) and the styrenic resin (B) in the composition. Though not clear, it is believed that the silicone compound having a functional group added to the composition will interfere with phosphine gas formation from red phosphorus existing in the composition, whereby the moldability of the composition could be enhanced and the mechanical strength of the moldings of the composition could be increased.

The silicone compound having a functional group includes, for example, functional group-having (poly) organosiloxanes, of which the skeleton is derived from a polymer or copolymer having a basic structure of a formula, $R^1_aR^2_bSiO_{(4-a-b)}$ wherein $R^1$ indicates a moiety having a functional group, $R^2$ indicates a hydrocarbon residue having from 1 to 12 carbon atoms, $0<a<2$, $0\leq b<2$, and $0<a+b\leq 2$. The functional group includes, for example, an alkoxy group, a hydroxyl group, a carboxyl group, a cyanol group, an amino group, and an epoxy group. The silicone compound may be liquid or powdery.

The flame-retardant thermoplastic resin composition of the invention may further contain (F) a fluoro-olefinic resin, which exhibits a resin melt-dropping preventing effect when the composition is fired. The fluoro-olefinic resin (F) is generally a polymer or copolymer having a fluoro-ethylenic structure, for example, including difluoroethylene polymers, tetrafluoroethylene polymers, tetrafluoroethylene-hexafluoropropylene copolymers, and copolymers of tetrafluoroethylene with fluorine-free ethylenic monomers. Preferred is polytetrafluoroethylene (PTFE) desirably having a mean molecular weight of at least 500,000, more desirably from 500,000 to 10,000,000.

More preferred is polytetrafluoroethylene having the ability to form fibrils, as its property of preventing resin melts from dropping is better. The fibril-forming polytetrafluoroethylene (PTFE) is not specifically defined, but preferred is PTFE of Type 3 stipulated in the ASTM Standard. Specific examples of PTFE of Type 3 include Teflon 6-J (from Mitsui-DuPont Fluorochemical), Polyflon D-1, Polyflon F-103, Polyflon F201L (all from Daikin Industry), and CD-076 (from Asahi ICI Fluoropolymers).

Others except PTFE of Type 3 are also employable herein, including, for example, Argoflon F5 (from Montefluos), Polyflon MPA and Polyflon FA-100 (both from Daikin Industry). These polytetrafluoroethylenes (PTFEs) may be used either singly or as combined. The fibril-forming polytetrafluoroethylenes (PTFEs) as above may be obtained, for example, by polymerizing tetrafluoroethylene in an aqueous solvent in the presence of sodium, potassium or ammonium peroxydisulfide, under a pressure of from 1 to 100 psi, at a temperature falling between 0 and 200° C., preferably between 20 and 100° C.

The fluoro-olefinic resin content of the composition may fall between 0.05 and 5 parts by weight, but preferably between 0.1 and 2 parts by weight relative to 100 parts by weight of the resin mixture of (A) and (B) in the composition. If the fluoro-olefinic resin content is smaller than 0.05 parts by weight, the resin melt-dropping preventing ability of the composition will be not enough for the intended flame retardancy of the composition. However, even if the content is larger than 5 parts by weight, the effect of the fluoro-olefinic resin added could not be augmented any more, and such a large amount of the fluoro-olefinic resin, if added to the composition, will have some negative influences on the impact resistance and the outward appearance of the moldings of the composition. Therefore, the amount of the fluoro-olefinic resin to be added to the composition may be suitably determined, depending on the necessary flame retardancy of the moldings of the composition, for example, based on V-0, V-1 or V-2 in UL-94, and depending on the amount of the other constituent components.

The flame-retardant thermoplastic resin composition of the invention may further contain a core/shell-type rubber-like elastomer, as a still another optional component (G), which further enhances the impact resistance of the moldings of the composition. The rubber-like elastomer content of the composition may fall between 1 and 30 parts by weight, but preferably between 2 and 20 parts by weight, relative to 100 parts by weight of the resin mixture of (A) and (B) in the composition. The rubber-like elastomer content shall be suitably and comprehensively determined in consideration of the necessary properties including impact resistance, heat resistance and rigidity of the intended moldings of the composition. The core/shell-type rubber-like elastomer to be the component (G) is preferably a core/shell-type, grafted rubber-like elastomer having a two-layered structure composed of a core and a shell, in which the core is of a flexible rubber material and the shell that covers the core is of a hard resin material. As a whole, the elastomer itself is powdery or granular. After blended with a polycarbonate resin and a styrenic resin in melt, the rubber-like elastomer of that type mostly keeps its original powdery or granular condition. Since the rubber-like elastomer keeps its original powdery or granular condition after having been blended with the resin melt, it is effective for preventing the moldings of the resin composition from being troubled by surface layer peeling.

Known are various core/shell-type, grafted rubber-like elastomers that are usable herein. Commercially-available products of such elastomers include, for example, Hiblen B621 (from Nippon Zeon), KM-330 (form Rohm & Haas), Metablen W529, Metablen S2001, Metablen C223, Metablen B621 (all from Mitsubishi Rayon).

Above all, preferred are those to be produced through polymerization of one or more vinylic monomers in the presence of a rubber-like polymer as obtained from monomers of essentially alkyl acrylates or alkyl methacrylates and dimethylsiloxane. In the alkyl acrylates and methacrylates, the alkyl group preferably has from 2 to 10 carbon atoms. Concretely, the alkyl acrylates and methacrylates include, for example, ethyl acrylate, butyl acrylate, 2-ethylhexyl acrylate, and n-octyl methacrylate. One example of the rubber-like elastomers as obtained from monomers of essentially those alkyl acrylates is a polymer to be prepared through reaction of at least 70% by weight of the alkyl acrylates with at most 30% by weight of other copolymerizable vinylic monomers such as methyl methacrylate, acrylonitrile, vinyl acetate, and styrene. To prepare the polymer, a polyfunctional monomer serving as a crosslinking agent, such as divinylbenzene, ethylene dimethacrylate, triallyl cyanurate, or triallyl isocyanurate, may be added to the polymerization system.

The vinylic monomers to be polymerized in the presence of a rubber-like polymer include, for example, aromatic vinyl compounds such as styrene, α-methylstyrene; acrylates such as methyl acrylate, ethyl acrylate; and methacrylates such as methyl methacrylate, ethyl methacrylate. One or more these monomers may be (co)polymerized, as combined, or may be copolymerized with any other vinylic monomers such as vinyl cyanide compounds (e.g., acrylonitrile, methacrylonitrile), and vinyl esters (e.g., vinyl acetate, vinyl propionate). The (co)polymerization may be effected in any known method of, for example, bulk polymerization, suspension polymerization, or emulsion polymerization. Preferred is emulsion polymerization.

It is desirable that the core/shell-type, grafted rubber-like elastomers thus produced in the manner mentioned above contain at least 20% by weight of the rubber-like polymer moiety. Typical examples of the core/shell-type, grafted rubber-like elastomers are MAS resin elastomers such as graft copolymers of styrene and methyl methacrylate with from 60 to 80% by weight of n-butyl acrylate. Other examples are composite rubber grafted copolymers to be prepared through graft copolymerization of a composite rubber with at least one vinylic monomer, in which the composite rubber comprises from 5 to 95% by weight of a polysiloxane rubber component and from 5 to 95% by weight of a polyacryl(meth)acrylate rubber component as so entangled that they are not separated from each other, and has a mean grain size of from 0.01 to 1 $\mu$m or so. The composite rubber grafted copolymers are better than single rubber grafted copolymers, as their effect of improving the impact resistance of resin moldings is higher than that of the latter, single rubber grafted copolymers. Commercial products of such composite rubber grafted copolymers are available, for example, Metablen S-2001 from Mitsubishi Rayon.

The flame-retardant thermoplastic resin composition of the invention may optionally contain an inorganic filler in addition to the essential component talc. The optional component, inorganic filler is to further enhance the strength, the rigidity and the flame retardancy of the moldings of the composition. The inorganic filler includes, for example, mica, kaolin, diatomaceous earth, calcium carbonate, calcium sulfate, barium sulfate, glass fibers, carbon fibers, and potassium titanate fibers. The inorganic filler may have a mean grain size of from 0.1 to 50 $\mu$m, but preferably from 0.2 to 20 $\mu$m. The amount of the inorganic filler that may be optionally in the composition of the invention may fall between 1 and 100 parts by weight, but preferably between 2 and 50 parts by weight, relative to 100 parts by weight of the resin mixture of (A) and (B) in the composition. If its amount is smaller than 1 part by weight, the inorganic filler added could not satisfactorily exhibit its effect of enhancing the rigidity and the flame retardancy of the moldings of the composition. However, if the amount of the inorganic filler is larger than 100 parts by weight, the impact resistance of the moldings will lower and the melt fluidity of the composition will lower. The amount of the inorganic filler to be in the composition may be suitably determined, depending on the necessary properties of the moldings and the moldability of the composition, especially on the thickness of the moldings and the spiral flow length of the composition.

As known in the art, the flame-retardant thermoplastic resin composition of the invention may contain any other organic phosphorus-containing flame retardant, especially preferably a non-halogen, organic phosphorus-containing flame retardant, in addition to the essential flame retardant, red phosphorus. The amount of the additional flame retardant to be in the composition may fall between 1 and 20 parts by weight, but preferably between 2 and 15 parts by weight, relative to 100 parts by weight of the resin mixture of (A) and (B) in the composition. The non-halogen, organic phosphorus-containing flame retardant for use in the invention is not specifically defined. However, preferred are non-halogen phosphate compounds having at least one esteric oxygen atom directly bonding to a phosphorus atom.

As the phosphate compounds, for example, usable are those of the following formula (1):

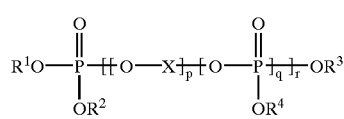

(1)

wherein $R^1$, $R^2$, $R^3$ and $R^4$ each independently indicate a hydrogen atom or an organic group; X indicates a divalent or higher polyvalent organic group; p is 0 or 1; q is an integer of 1 or larger; and r is an integer of 0 or larger.

In formula (I), the organic group includes, for example, substituted or unsubstituted alkyl, cycloalkyl and aryl groups. The substituents for the substituted groups include, for example, alkyl groups, alkoxy groups, aryl groups, aryloxy groups, and arylthio groups. These substituents may be combined to give arylalkoxyalkyl groups, or may be bonded, for example, via oxygen, nitrogen and/or sulfur atoms to give arylsulfonylaryl groups.

In formula (I), the divalent or higher polyvalent organic group X is meant to include divalent or higher polyvalent groups to be derived from the organic groups as above by removing one or more hydrogen atoms bonding to carbon atoms. For example, it includes alkylene groups, (substituted) phenylene groups, and groups as derived from bisphenols of polycyclic phenols. Preferred are groups derived from bisphenol A, hydroquinone, resorcinol, diphenylmethane, dihydroxydiphenyl, and dihydroxynaphthalene.

The non-halogen phosphate compounds may be monomers, oligomers, polymers or their mixtures. Concretely, they include, for example, trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, tri(2-ethylhexyl)phosphate, diisopropylphenyl phosphate, trixylenyl phosphate, tris(isopropylphenyl) phosphate, trinaphthyl phosphate, bisphenol A bisphosphate, hydroquinone bisphosphate, resorcinol bisphosphate, resorcinol-diphenyl phosphate, trihydroxybenzene triphsophate, cresyldiphenyl phosphate, and their substituted derivatives.

Commercially-available, non-halogen phosphates usable in the invention are, for example, TPP [triphenyl phosphate], TXP [trixylenyl phosphate], CR733S [resorcinol(diphenyl phosphate)], PX200 [1,3-phenylene-tetrakis(2,6-dimethylphenyl)phosphate], PX201 [1,4-phenylene-tetrakis (2,6-dimethylphenyl)phosphate], and PX202 [4,4'-biphenylene-tetrakis(2,6-dimethylphenyl)phosphate], all from Daihachi Chemical Industry.

Apart from the essential components (A) to (D) and at least one optional component selected from (E) to (G) and also inorganic fillers and phosphates that constitute the flame-retardant thermoplastic resin composition of the invention, the composition may further contain any other additives which are generally added to ordinary thermoplastic resins, if desired. The additives are for further improving the moldability of the composition and for further improving the impact resistance, the outward appearance, the weather resistance and the rigidity of the moldings of the composition. For example, the additives include phenolic, phosphorus-containing or sulfur-containing antioxidants, antistatic agents, polyamide-polyether block copolymers (for permanent static electrification resistance), benzotriazole-type or benzophenone-type UV absorbents, hindered amine-type light stabilizers (weather-proofing agents), microbicides, compatibilizers, and colorants (dyes, pigments). The amount of the optional additive that may be in the resin composition of the invention is not specifically defined, provided that it does not interfere with the properties of the composition.

Methods for producing the resin composition of the invention are described. The flame-retardant thermoplastic resin composition of the invention may be produced by mixing and kneading the components (A) to (D) in a predetermined ratio as above, optionally along with the optional components (E) to (G) and with other additives as above in any desired ratio. Formulating and mixing them may be effected in any known manner, for example, by pre-mixing them in an ordinary device, such as a ribbon blender or a drum tumbler, followed by further kneading the resulting pre-mix in a Henschel mixer, a Banbury mixer, a single-screw extruder, a double-screw extruder, a multi-screw extruder, or a cokneader. The temperature at which the components are mixed and kneaded generally falls between 240 and 300° C. Other components than the polycarbonate resin and the styrenic resin may be previously mixed with the polycarbonate or styrenic resin or wIth any other thermoplastic resin to prepare a master batch, and it may be added to the other constituent components.

Having been prepared in the manner noted above, the flame-retardant thermoplastic resin composition of the invention may be molded into various moldings in the melt-molding devices as above, or, after it is pelletized, the resulting pellets may be molded into various moldings through injection molding, injection compression molding, extrusion molding, blow molding, pressing, vacuum forming or foaming. Especially preferably, the composition is pelletized in the melt-kneading manner as above, and the resulting pellets are molded into moldings through injection molding or injection compression molding. For injection molding of the composition, preferred is a gas-introducing molding method so as to prevent shrinkage cavity around the moldings and to reduce the weight of the moldings.

Moldings of the flame-retardant thermoplastic resin composition of the invention as produced through injection molding or compression infection molding are usable as various housings and parts for office automation appliances, information and communication appliances and other electric and electronic appliances for household or industrial use, such as duplicators, facsimiles, televisions, radios, tape recorders, video decks, personal computers, printers, telephones, information terminals, refrigerators, and microwave ovens. The moldings have still other applications, and are usable, for example, as car parts.

The invention is described in more detail with reference to the following Examples and Comparative Examples, which, however, are not intended to restrict the scope of the invention.

Examples 1 to 3 and Comparative Examples 1 and 2

The components shown in Table 1 below were blended in the ratio indicated therein (the components (A) and (B) are in terms of % by weight, and the other components are in terms of parts by weight relative to 100 parts by weight of the total of (A) and (B)), fed into an extruder (VS40 from Tanabe Plastic Machinery), melted and kneaded therein at 260° C., and then pelletized. To all compositions of Examples and Comparative Examples, added were 0.2 parts by weight of Irganox 1076 (from Ciba Specialty Chemicals) and 0.1 parts by weight of Adekastab C (from Asahi Denka Industry) both serving as an antioxidant.

In the following Examples and Comparative Examples, all samples were colored with a colorant for Munsell Number 2.0Y7.5/0.5 (light gray), and tested for their properties. Briefly, titanium oxide was added to the samples, and its amount was so controlled that the samples could be colored in light gray having the Munsell Number as above. The resin pellets prepared as above were dried at 80° C. for 12 hours, and then molded into test pieces through injection molding at 260° C. These test pieces were tested for their properties in various test methods, and their data obtained are shown in Table 1.

The materials used for producing the test samples, and the methods for testing the samples are mentioned below.

Molding Materials
(A) Polycarbonate Resin
PC: Toughlon A1900 (from Idemitsu Petrochemical).
 This is a bisphenol A polycarbonate resin having MI of 20 g/10 min (at 300° C., under a load of 1.2 kg), and a viscosity-average molecular weight of 19000.
(B) Styrenic Resin
HIPS: Impact-resistant polystyrene resin (IDEMITSU-PS-IT44 from Idemitsu Petrochemical).
 This is a styrene-grafted polybutadiene having a rubber content of 10% by weight and MI of 8 g/10 min (at 200° C., under a load of 5 kg).
ABS: Acrylonitrile-butadiene-styrene copolymer (DP-611 from Technopolymer).

This has MI of 2 g/10 min (at 200° C., under a load of 5 kg)
(C) Red Phosphorus
 P-1: Novared Excel 140 (from Phosphorus Chemical Industry).
  This is a phenolic resin-stabilized red phosphorus, having a mean grain size of 28 $\mu$m.
 P-2: Novared Excel F5 (from Phosphorus Chemical Industry).
  This is a phenolic resin-stabilized red phosphorus, having a mean grain size of 3 $\mu$m.

(D) Talc
 FFR (from Asada Flour Milling), having a mean grain size of 0.7 $\mu$m and an aspect ratio of 15.
(E) Silicone Compound Having Functional Group
 KC-89 (methoxysilicone compound, from Shin-etsu Chemical Industry).
(F) Fluoro-olefinic Resin
 PTFE: F210L (from Daikin Chemical Industry), having a molecular weight of from 4,000,000 to 5,000,000.
(G) Core/shell-type, Grafted Rubber-like Elastomer (Rubber-like Elastomer)
 Composite rubber-type graft copolymer: Metablen S2001 (from Mitsubishi Rayon), having a polydimethylsiloxane content of at least 50% by weight. Titanium oxide (CR63, from Ishihara Sangyo)

Testing Methods
(1) Melt Fluidity
 The flow value (Q value) of each sample (at a flow rate of $10^{-2}$ ml/sec, at 280° C. and under a load of 160 kg) was measured, according to JISK7210.
(2) Outward Appearance of Moldings
 Test pieces were macroscopically checked with the naked eye.
(3) IZOD (Izod Impact Strength)
 Measured according to ASTMD256. The temperature was 23° C., and the thickness of samples was 1/8 inches. The data are in terms of $kJ/m^2$.
(4) Flexural Modulus
 Measured according to JISK7203 at 23° C. The thickness of samples was 4 mm. The data are in terms of MPa.
(5) Flame Retardancy
 Tested according to the UL94 combustion test. Samples tested had a thickness of 1.5 mm.

TABLE 1

| | | | Example 1 | Compara. Example 1 | Example 2 | Compara. Example 2 | Example 3 |
|---|---|---|---|---|---|---|---|
| Composition | (A) | PC | 80 | 80 | 85 | 85 | 70 |
| | (B) | HIPS | 20 | 20 | 15 | 15 | — |
| | | ABS | — | — | — | — | 30 |
| | (C) | P-1 | 0.7 | 0.7 | — | — | 0.8 |
| | | P-2 | — | — | 0.6 | 0.6 | — |
| | (D) | talc | 15 | 0 | 10 | 3 | 10 |
| | (E) | methoxysilicone compound | — | — | 0.5 | 0.5 | 0.6 |
| | (F) | PTFE | 0.3 | 0.3 | 0.2 | 0.2 | 0.2 |
| | (G) | rubber-like elastomer | 5 | 5 | 5 | 5 | — |
| | | titanium oxide (necessary amount for coloration) | 2 | 12 | 4 | 10 | 3.5 |
| Test Data | | (1) Melt fluidity (Q value) | 22 | 29 | 19 | 25 | 31 |
| | | (2) Appearance of moldings | good | silver marks found | good | silver marks found | good |
| | | (3) IZOD impact strength ($kJ/m^2$) | 28 | 17 | 45 | 16 | 50 |
| | | (4) Flexural modulus | 3900 | 2300 | 3300 | 2600 | 3400 |
| | | (5) UL-94 (thickness: 1.5 mm) | V-0 | V-1 | V-0 | V-1 | V-0 |

The following matters are obvious from the data in Table 1. The samples of Example 1 are compared with those of Comparative Example 1, and it is obvious that the moldings of the flame-retardant thermoplastic resin composition of the invention require a much reduced amount of titanium oxide to be added thereto for color control. Therefore, the amount of titanium oxide to be in the composition of the invention can be reduced, thereby resulting in that the resins in the composition are prevented from being decomposed (in this connection, the Q value in Comparative Example 1 increased) and the moldings of the composition have high impact resistance. In addition, the rigidity of the moldings is noticeably high and the thickness of the moldings can be reduced. Moreover, the difference in the outward appearance and the flame retardancy of the moldings between Example 1 and Comparative Example 1 is obvious. From the data in Comparative Example 2, it is understood that the problem of red coloration of the moldings with red phosphorus could not be solved if a specifically defined amount of talc is not added to the resin composition.

As described in detail hereinabove, the flame-retardant thermoplastic resin composition of the invention contains no halogen and has good flame retardancy and high impact strength. In addition, since the composition has high heat resistance, the resins in the composition are not decomposed while the composition is molded. The moldings of the composition have good outward appearance. In particular, even when a rubber-modified styrenic resin is in the composition along with the essential polycarbonate resin, the rigidity and the heat resistance of the composition are not lowered at all, and the amount of titanium oxide to be in the composition can be much reduced. The flame-retardant thermoplastic resin composition of the invention is well molded into large-sized and thin-walled moldings of many applications to, for example, office automation appliances, information and communication appliances, other electric and electronic appliances for industrial use and household use, and car parts.

What is claimed is:

1. A flame-relardant thermoplastic resin composition comprising 100 parts by weight of a resin mixture of (A) from 50 to 95% by weight of a polycarbonate resin and (B) from 5 to 50% by weight of a styrenic resin, from 0.1 to 10 parts by weight of (C) red phosphorus, and from 5 to 50 parts by weight of (D) talc.

2. The flame-retardant thermoplastic resin composition as claimed in claim 1, wherein red phosphorus is stabilized.

3. The flame-retardant thermoplastic resin composition as claimed in claim 1, which further contains from 0.05 to 5 parts by weight, relative to 100 parts by weight of the resin mixture of (A) and (B), of (E) a silicone compound having a functional group.

4. The flame-retardant thermoplastic resin composition as claimed in claim 3, which further contains from 0.05 to 5 parts by weight, relative to 100 parts by weight of the resin mixture of (A) and (B), of (F) a fluoro-olefinic resin.

5. The flame-retardant thermoplastic resin composition as claimed in claim 4, which further contains from 1 to 30 parts by weight, relative to 100 parts by weight of the resin mixture of (A) and (B), of (G) a core/shell-type, grafted rubber-like elastomer.

6. The flame-retardant thermoplastic resin composition as claimed in claim 1, wherein talc has a mean grain size of from 0.5 to 50 μm and an aspect ratio of from 2 to 20.

7. Injection moldings of the flame-retardant thermoplastic resin composition of any one of claims 1 to 6.

8. Housings or parts for office automation appliances, information and communication appliances, and other electric or electronic appliances for industrial use or household use, as produced through injection molding of the flame-retardant thermoplastic resin composition of any one of claims 1 to 6.

9. A flame-retardant thermoplastic resin composition consisting essentially of 100 parts by weight of a resin mixture of (A) from 50 to 95% by weight of a polycarbonate resin and (B) from 5 to 50% by weight of a styrenic resin, from 0.1 to 10 parts by weight of (C) red phosphorous, and from 5 to 50 parts by weight of (D) talc.

10. The flame-retardant thermoplastic resin composition of claim 9, wherein the red phosphorous is stabilized.

11. The flame-retardant thermoplastic resin composition of claim 9, which further contains from 0.05 to 5 parts by weight, relative to 100 parts by weight of the resin mixture of (A) and (B), of (E) a silicone compound having a functional group.

12. The flame-retardant thermoplastic resin composition of claim 11, which further contains from 0.05 to 5 parts by weight relative to 100 parts by weight of the resin mixture of (A) and (B), of (F) a fluoro-olefinic resin.

13. The flame-retardant thermoplastic resin composition of claim 12, which further contains from 1 to 30 parts by weight, relative to 100 parts by weight of the resin mixture of (A) and (B), of (G) a core/shell-type, grafted rubber-like elastomer.

14. The flame-retardant thermoplastic resin composition of claim 9, wherein the talc has a mean grain size of from 0.5 to 50 μm and an aspect ratio of from 2 to 20.

15. An injection molded article repaired by molding the flame-retardant thermoplastic resin composition of claim 9.

16. Housings or parts for office automation appliances, information and communication appliances, and other electric or electronic appliances for industrial use or household use, produced by injection molding the flame-retardant thermoplastic resin composition of claim 9.

\* \* \* \* \*